United States Patent [19]

Myers

[11] 4,293,730

[45] Oct. 6, 1981

[54] METHOD AND APPARATUS FOR DETECTING A GROUND ON ELECTRIC FURNACES

[75] Inventor: Robert W. Myers, Newark, Ohio

[73] Assignee: Owens-Corning Fiberglas Corporation, Toledo, Ohio

[21] Appl. No.: 93,772

[22] Filed: Nov. 13, 1979

[51] Int. Cl.³ .............................................. C03B 5/02
[52] U.S. Cl. ............................................ 13/6; 13/24
[58] Field of Search ................ 13/6, 23, 24; 361/42

[56] References Cited

U.S. PATENT DOCUMENTS 2,984,829  5/1961  Augsburger.
3,086,999  4/1963  Kramer ................................. 13/24

Primary Examiner—Roy N. Envall, Jr.
Attorney, Agent, or Firm—Ronald C. Hudgens; Patrick P. Pacella; Paul T. Kashimba

[57] ABSTRACT

A method of and apparatus for detecting a ground on an electric furnace comprising connecting an electrode, which is located in the furnace, to ground potential and sensing the current flowing from the electrode to ground. The method and apparatus may also include comparing the sensed current with a first and second reference signal and actuating an appropriate alarm when the sensed current is greater than the first reference signal or less than the second reference signal and interrupting the electrical power to the furnace when the sensed current is greater than the first reference signal.

8 Claims, 2 Drawing Figures

METHOD AND APPARATUS FOR DETECTING A GROUND ON ELECTRIC FURNACES

BACKGROUND OF THE INVENTION

This invention relates to electric melt and electric boost furnaces and, more particularly, to a method of and apparatus for preventing damage to such furnaces caused by insulation failure or inadvertent grounding of the furnace.

In electric melt and electric boost furnaces for melting electrically conductive material, such as glass for the making of glass fibers, the furnace, as well as steel structures in contact therewith and steel structures proximate thereto, is electrically isolated from ground. The other steel support structures are insulated from both the furnace and the aforesaid structures and are connected electrically to ground by a ground wire, welding or similar means. Generally, building steel, furnace steel, equipment grounds and substation grounds are electrically tied together. In addition, a grounding electrode, i.e., an electrode that is connected to ground potential, is installed in the forehearth of the furnace to protect personnel and equipment in that area.

Prior art electric furnaces have not provided a means for determining that a second ground, i.e., a ground in addition to the grounding electrode, has been imposed on the furnace, for example, by breakdown of the insulation on an electrode jack head assembly. The existence of such a ground, if not detected and cleared, can result in catastrophic refractory failure.

Therefore, it is an object of this invention to provide a method of and apparatus for detecting a ground on an electric melt or electric boost furnace.

SUMMARY OF THE INVENTION

In accordance with the present invention, there is provided a method of detecting a ground on an electric furnace comprising connecting an electrode, which is located in the furnace, to ground potential and sensing the current flowing from the grounded electrode to ground.

In addition, the present invention provides an apparatus for detecting a ground on an electric furnace comprising an electrode positioned in the furnace, means for connecting the electrode to ground potential and means associated with the connecting means for sensing the current flowing to ground.

In various embodiments the present invention provides a method of and apparatus for continuously monitoring the magnitude of the current flowing through the grounding electrode, utilizing the data obtained to indicate the existence of an undesired ground on the furnace, utilizing the data to indicate the present condition of the grounding electrode and utilizing the data to take precautionary measures to prevent damage to the furnace or other equipment.

In one embodiment the present invention provides operating personnel with information that insulation on the furnace is in the process of deteriorating, thus allowing the correction of such condition prior to an actual short-circuiting of the furnace to ground. In the event of an immediate fault, the present invention alerts operating personnel that such condition exists thereby enabling them to clear such fault or take other necessary action, such as interrupting the electrical power to the furnace.

Accordingly, the present invention provides an economical, efficient and reliable method of and apparatus for determining the existence of an undesired ground on the furnace to prevent catastrophic refractory or other damage, which would occur if such fault was not detected and cleared.

Other objectives, advantages and applications of the present invention will be made apparent by the following detailed description of the preferred embodiment of the invention.

DETAILED DESCRIPTION OF PREFERRED EMBODIMENTS

Figure 1:
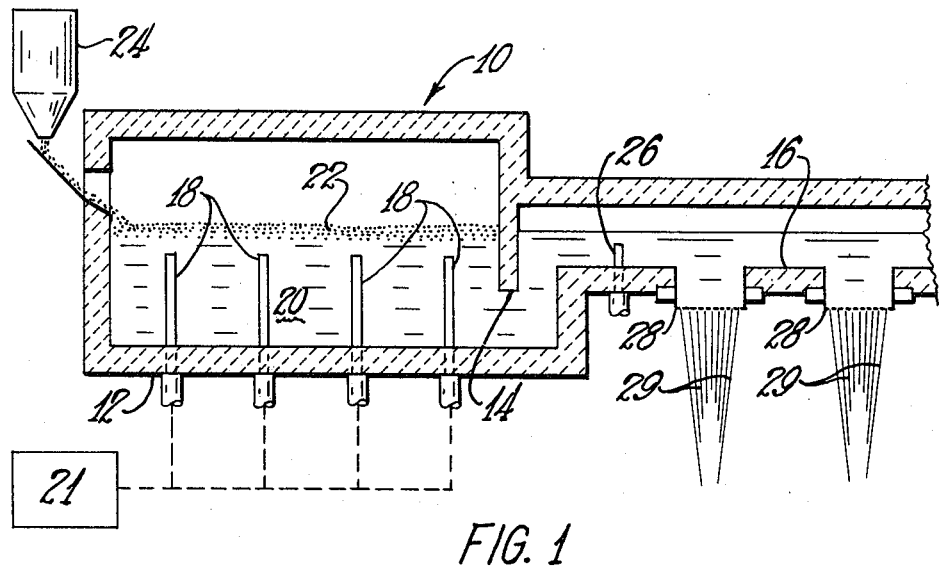
FIG. 1 is a schematic side elevational view of a typical glass melting furnace.

Referring to FIG. 1, a typical glass-melting furnace is indicated generally at 10. Furnace 10 has a melting tank 12 from which glass is discharged passed a skimmer block 14 to a discharge passage or forehearth 16. A plurality of electrodes 18 extend upwardly through the bottom of melting tank 12. Electrodes 18 are suitably positioned throughout tank 12 in a desired pattern, as is well known in the electrical furnace art, and are supplied with power from a controlled source of power designated generally at 21. The glass in tank 12 is melted by current flowing between electrodes 18 to form a pool 20 of molten glass. Glass batch is provided to furnace 10 by any suitable means, which is indicated generally at 24, to provide a layer or crust 22 of glass batch on the surface of pool 20 so that batch layer 22 replenishes the molten glass of pool 20 that flows outwardly through forehearth 16. The molten glass of pool 20 flows under skimmer block 14 and along forehearth 16 to fiber forming bushings 28, from which glass fibers 29 are attenuated, as is known in the art. An electrode 26 is located in forehearth 16 approximately midway between skimmer block 14 and the first of bushings 28.

Figure 2:
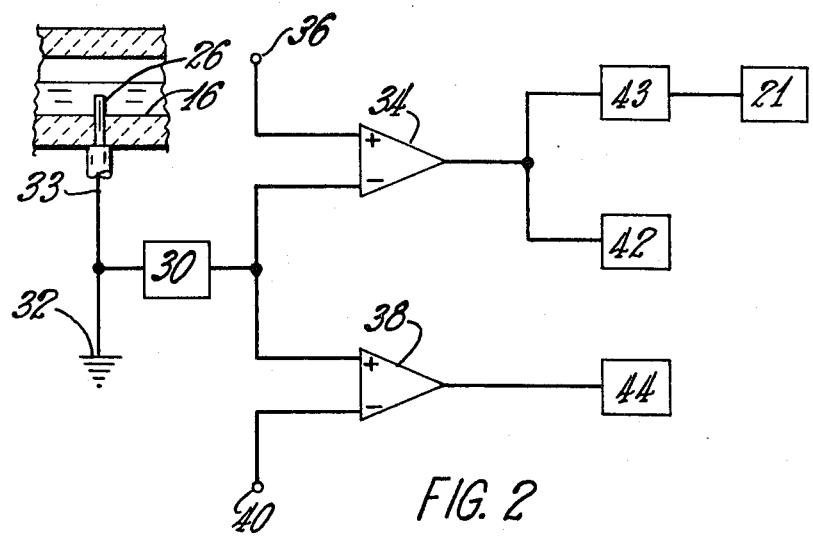
FIG. 2 is a schematic block diagram showing the incorporation of the present invention into a typical glass melting furnace.

Referring to FIG. 2, electrode 26 is connected to ground potential, which is indicated at point 32, by conductor 33. A current sensor 30, such as a current transformer, is connected to conductor 33 to sense the current flowing through conductor 33. The output of current sensor 30 is connected to one input terminal of an operational amplifier 34 which is connected in a comparative mode. A reference signal which corresponds to the desired maximum current flowing to ground through conductor 33, is entered at input terminal 36 of operational amplifier 34. The output of operational amplifier 34 is connected to an alarm 42 and to a means, which is indicated generally by numeral 43, for interrupting the power to electrodes 18; interruption means 43 may be an electrically actuated circuit breaker or the like, which is connected to controlled source of power 21. The output of current sensor 30 is also connected to one input terminal of operational amplifier 38 which is connected in a comparative mode. A reference signal indicative of the desired maximum amount of current flowing to ground through conductor 33 is provided to the other input terminal 40 of operational amplifier 38. The output of operational amplifier 38 is connected to an alarm 44.

Current sensor 30 senses the current flowing to ground through conductor 33 and provides a signal indicative thereof to operational amplifiers 34 and 38. Operational amplifier 34 compares the signal generated by current sensor 30 with the reference signal inputted at terminal 36, which is indicative of the maximum current level before an alarm is sounded. The magnitude of the reference signal inputted at terminal 36 must be determined for each furnace; however, grounding electrode 26 generally carries less than 5 amperes if the furnace does not have an existing problem. If the output of current sensor 30 exceeds the magnitude of the reference signal inputted at terminal 36, such as when insulation isolating furnace 10 breaks down or someone inadvertently connects a conducting means from ground potential to isolated furnace 10, operational amplifier 34 actuates alarm 42 and power interrupt means 43, which interrupts power to controlled power supply 21. Accordingly, operating personnel are alerted that an undesired ground exists and the power supply to the furnace is disconnected to prevent damage to the furnace or other equipment.

The output of current sensor 30 is also inputted to operational amplifier 38 where it is compared with the reference signal provided at terminal 40. The reference signal inputted at terminal 40 is indicative of the minimum current before an alarm condition is sounded indicating that electrode 26 has failed; generally, a current of at least a few milliamperes flows to ground on a normal furnace. In the event that the current sensed by current sensor 30 is less than the reference signal supplied at terminal 40, operational amplifier 38 will actuate an alarm 44.

In the preferred embodiment, the functions performed by operational amplifiers 34 and 38 may be performed by a digital computer, such as an integrated circuit microcomputer. The output of current sensor 30 would be converted to a digital signal by normal conversion means. The desired current limits, i.e., the minimum and maximum currents, may be stored in the memory of the microcomputer. If the current sensed by current sensor 30 is not within the prescribed limits, the microcomputer would actuate the appropriate alarm and, if desired, interrupt the power to electrodes 18. In addition, the microcomputer may record the sensed current at predetermined intervals; such information being useful in determining the deterioration of insulation, before an actual fault condition.

In another embodiment, the present invention may comprise a current sensor 30 having its output terminals connected to the actuating coil of a relay, such as a latching relay. The relay contacts, which are in the normally open position, are connected in an alarm circuit so that power is supplied to the alarm only when the current flowing through conductor 33 is large enough to cause sensor 30 to produce an output of sufficient magnitude to actuate the relay which, in turn, actuates the alarm.

In still another embodiment, the coil of a latching relay may be used as current sensor 30. The relay contacts would be connected in the same manner as discussed above so that electrical energy is provided to the alarm only after the relay coil has been properly energized. The actuating coil of the relay may be connected directly in line between grounding electrode 26 and ground potential 32, provided that its impedance is small enough so that it does not interfere with the normal operation of grounding electrode 26.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

I claim:

1. A method of detecting a ground on an electric furnace, said method comprising the steps of: connecting an electrode, which is located in said furnace, to ground potential; sensing the current flowing from said electrode to ground; comparing the sensed current with a first reference signal indicative of the maximum desired current flowing to ground through said grounded electrode; and providing a first alarm signal when said sensed current is greater than said first reference signal.

2. A method as recited in claim 1, wherein said method further comprises the step of interrupting the electrical power supplied to said furnace in response to said first alarm signal.

3. A method as recited in claims 1 or 2, wherein said method further comprises the step of comparing said sensed current with a second reference signal indicative of the minimum desired current flowing to ground through said grounded electrode and providing a second alarm signal when the sensed current is less than said second reference signal.

4. A method as recited in claim 1, wherein said grounded electrode is located in the forehearth of said furnace.

5. An apparatus for detecting a ground on an electric furance, said apparatus comprising: an electrode positioned in said furance, means for connecting said electrode to ground potential; means associated with said connecting means for sensing the current flowing to ground; first means associated with said current sensing means for comparing the output of said current sensing means with a first reference signal indicative of the maximum desired current flowing to ground through said grounded electrode; and means responsive to said first comparing means for providing a first alarm signal when the sensed current is greater than said first reference signal.

6. An apparatus as recited in claim 5, wherein said apparatus further comprises means responsive to said first alarm signal for interrupting the electrical power provided to said furnace.

7. An apparatus as recited in claims 5 or 6, wherein said apparatus further comprises second means associated with said current sensing means for comparing said sensed current with a second reference signal indicative of the minimum desired current flowing to ground through said grounded electrode and means responsive to said second means for providing a second alarm signal when said sensed current is less than said second reference signal.

8. An apparatus as recited in claim 5, wherein said furnace has a forehearth and said electrode is located in said forehearth.

* * * * *